US007124089B2

(12) United States Patent
Cornwell

(10) Patent No.: US 7,124,089 B2
(45) Date of Patent: Oct. 17, 2006

(54) METHOD AND SYSTEM FOR RESERVING AIR CHARTER AIRCRAFT

(75) Inventor: Trevor Cornwell, Washington, DC (US)

(73) Assignee: Bombardier Inc., Montreal (CA)

( * ) Notice: Subject to any disclaimer, the term of this patent is extended or adjusted under 35 U.S.C. 154(b) by 965 days.

(21) Appl. No.: 09/847,323

(22) Filed: May 3, 2001

(65) Prior Publication Data

US 2002/0013718 A1     Jan. 31, 2002

Related U.S. Application Data

(60) Provisional application No. 60/238,010, filed on Oct. 6, 2000, provisional application No. 60/202,431, filed on May 8, 2000.

(51) Int. Cl.
*G06Q 10/00* (2006.01)
(52) U.S. Cl. .......................................................... 705/5
(58) Field of Classification Search ..................... None
See application file for complete search history.

(56) References Cited

U.S. PATENT DOCUMENTS

| | | | | |
|---|---|---|---|---|
| 4,862,357 | A | * | 8/1989 | Ahlstrom et al. ............... 705/6 |
| 5,897,620 | A | * | 4/1999 | Walker et al. .................. 705/5 |
| 6,023,685 | A | * | 2/2000 | Brett et al. ..................... 705/5 |
| 6,304,850 | B1 | * | 10/2001 | Keller et al. ................... 705/5 |
| 6,314,361 | B1 | * | 11/2001 | Yu et al. ........................ 705/5 |
| 6,711,548 | B1 | * | 3/2004 | Rosenblatt ..................... 705/5 |
| 6,801,226 | B1 | * | 10/2004 | Daughtrey ..................... 705/6 |
| 6,847,939 | B1 | * | 1/2005 | Shemesh ...................... 705/26 |

FOREIGN PATENT DOCUMENTS

EP      1 058 200      *   6/2000

OTHER PUBLICATIONS

No author, The Major Players;Sep. 2000, Business & Commercial Aviation, vol. 87, No. 3, p. 58; dialog copy 7 pages.*
BidJetCharter.com website; Sep. 3, 2000; Wayback Machine web archive site; 1 page.*
AirCharter.com website; Mar. 4, 2000; Wayback Machine web archive site; 3 pages.*
Pelline, Jeff; Travelers Bidding on Airline Tickets; 1991; The San Francisco Chronicle, 2 pages.*

* cited by examiner

*Primary Examiner*—Thomas A. Dixon
(74) *Attorney, Agent, or Firm*—Pillsbury Winthrop Shaw Pittman LLP

(57) ABSTRACT

The present invention is a method and system for pricing and reserving charter aircraft. In a preferred embodiment, itinerary information is received, via computer, from a user and is compared with information contained in maintained databases to identify charter aircraft suitable for accommodating the user. The system then determines a charter price by calculating total charter prices for each of the suitable charter aircraft. Several factors including flight costs, relocation costs, repositioning costs and layover costs are considered in calculating the total charter prices. Finally, the total charter prices are preferably selectively categorized and transmitted, via computer, to the user who is then able to complete the reservation process. In another preferred embodiment, lowest charter prices are transmitted to the user for alternative charter aircraft travel. In another preferred embodiment, users can engage in either a reverse auction or a real-time auction for available charter aircraft travel.

52 Claims, 2 Drawing Sheets

METHOD AND SYSTEM FOR RESERVING AIR CHARTER AIRCRAFT

This application claims priority to U.S. Provisional Patent Application Ser. No. 60/202,431, filed on May 8, 2000, entitled "Method and System for Reserving Charter Aircraft." This application also claims priority to U.S. Provisional Patent Application Ser. No. 60/238,010, filed on Oct. 6, 2000, entitled "Method and System for Reserving Charter Aircraft." Both applications are incorporated herein by reference.

FIELD OF THE INVENTION

The present invention relates to computerized reservations methods and systems for accepting, tracking and completing reservations made by consumers of aircraft charter services provided by third party carriers and for creating and maintaining databases of third party carrier information. More specifically, the present invention relates to a computerized on-line aircraft charter reservation and scheduling method and system that enables consumers to specify an itinerary, to either specify a price or receive a price for that itinerary for at least one aircraft and reserve an aircraft for completing the specified itinerary.

BACKGROUND

Currently, the most common method for air travel is on a scheduled flight with a commercial carrier. Various methods including accessing on-line databases exist for reserving seats on these scheduled flights. Nevertheless, it is frequently desirable for an individual or group to have an itinerary that cannot be accommodated by commercial carriers. The alternative for such individuals and groups is to contract with a charter aircraft operator to accommodate the desired itinerary. Because charter aircraft operators tend to be relatively small and numerous, the charter aircraft industry is particularly fragmented. Consequently, it is typically difficult for charter aircraft consumers to comparison shop for aircraft charter options and prices. Needs, therefore, exist for a means of consolidating aircraft charter information in a manner that enables consumers of such services to rapidly and easily price and reserve charter aircraft services capable of accommodating a desired itinerary.

SUMMARY OF THE INVENTION

It is accordingly an aspect of the present invention to provide a method and a system for determining the availability of aircraft for charter flights.

It is another aspect of the present invention to provide a method and a system for maintaining a database of charter aircraft information.

It is another aspect of the present invention to provide a method and a system enabling consumers to quickly and easily reserve aircraft for charter flights.

It is another aspect of the present invention to provide a method and a system for rapidly calculating the cost of aircraft charter flights.

It is another aspect of the present invention to provide a method and a system for calculating a number of alternative available aircraft charter flight options.

It is another aspect of the present invention to provide a method and a system for permitting bidding on aircraft charter flights.

It is another aspect of the present invention to provide a means for users to specify a desired price and determining if air charter flights can be arranged for that price.

It is another aspect of the present invention to provide a method and a system for accomplishing the foregoing by making use of global communications networks such as the World Wide Web.

The present invention satisfies these and other needs by providing a method and a system for enabling consumers to rapidly and easily price and reserve charter aircraft services. In a preferred embodiment, information concerning a plurality of charter aircraft is stored and maintained in a charter aircraft information database, preferably in a manner such that this information is accessible via global computer networks and/or local area networks. Such information as the current status, flight characteristics, present location, known future locations, occupancy capacity and operational costs for each charter aircraft is preferably included in the charter aircraft information database. The current status of the charter aircraft preferably includes the present and known future locations of the charter aircraft.

The method and system of the present invention provides for receiving itinerary information from a user. In a preferred embodiment, at least one departure location and at least one destination location are received as itinerary information from a user. In addition, the user is able to designate more than one flight leg, typically to reserve a round trip charter. In another preferred embodiment, destination and departure times or ranges of times and the number of passengers to be accommodated are also received as itinerary information from a user.

The method and system of the present invention further provides for identifying suitable charter aircraft using the charter aircraft information and the received itinerary information. In a preferred embodiment, identifying suitable charter aircraft is accomplished by eliminating charter aircraft having a negative status, by eliminating charter aircraft having inappropriate flight characteristics and by eliminating charter aircraft having a present location beyond a prescribed maximum relocation distance. This task is similarly accomplished instead by selecting charter aircraft having a positive status, by selecting charter aircraft having appropriate flight characteristics and by selecting charter aircraft having a present location within a prescribed maximum relocation distance. Identifying suitable charter aircraft also preferably takes into account the designated number of passengers and the occupancy capacity of each charter aircraft.

The method and system of the present invention further provides for determining a charter price for at least one of the identified suitable charter aircraft. Preferably, the charter price is determined for each of the identified suitable charter aircraft. In a preferred embodiment, charter price is determined by calculating the cost of flying from a designated departure location to a designated destination location based on the cost of operating the charter aircraft and a calculated flight factor for the specific charter aircraft. The cost of operating each charter aircraft is retrievably stored in the charter aircraft information database. The calculated flight factor is based on either the distance between the departure location and the destination location or the flight time required to traverse that distance or both. Information about grid winds between the two locations is preferably taken into account when flight factors are calculated.

The determination of charter price also preferably takes into account several additional factors, when applicable, that collectively are used to calculate a total charter price. For example, to determine the total charter price, the flight cost for a given charter aircraft takes into account the cost of repositioning the charter aircraft to the user's designated departure location(s), the cost of repositioning the charter aircraft to a post-charter location(s), the cost of relocating the charter aircraft from the user's first destination location(s) to an intermediate location(s), the cost of relocating the charter aircraft to the user's second designated departure location(s) and the cost of keeping the charter aircraft at the user's first destination location(s) until the second leg occurs.

Typically, the total charter price for each of the identified suitable charter aircraft is then calculated based on the cost of operating the charter aircraft, the calculated flight cost for the charter aircraft and the lesser of the layover cost and the relocating costs. If repositioning costs are also necessary, these cost will be added to the flight cost.

In another preferred embodiment, the method and system of the present invention further provides for accessing an airport information database, such as a Jeppesson airport database containing airport specific information such as longitudinal and latitudinal coordinates, elevation and runway restrictions for each airport. The information contained in the airport information database is useful for eliminating charter aircraft that are incompatible for airports in the vicinity of the user specified departure location and destination location. The information contained in the airport information database is also useful for calculating flight time between specific airports.

The method and system of the present invention further provides for transmitting, or otherwise making known to the user, the charter price for at least one of the suitable charter aircraft. Each outputted charter price is preferably accompanied by corresponding charter aircraft information from the charter aircraft information database.

In a preferred embodiment, the method and system of the present invention further provides for enabling the user to select a charter aircraft to be reserved.

In another preferred embodiment, the method and system of the present invention further provides for completing and confirming the reservation process once a user has selected a charter aircraft to be reserved.

In an alternative embodiment, a charter price is received as itinerary information from a user. The charter aircraft information database is then used to identify charter aircraft that are suitable for accommodating the user at or below the specified charter price. Charter aircraft information about at least one of the identified suitable charter aircraft, if any, is then outputted or made known to the user. Finally, the user is either permitted or obligated to make a reservation for one of the identified suitable charter aircraft, and the reservation process is then completed, confirmed and, if desirable, reconfirmed.

DETAILED DESCRIPTION

Figure 1:
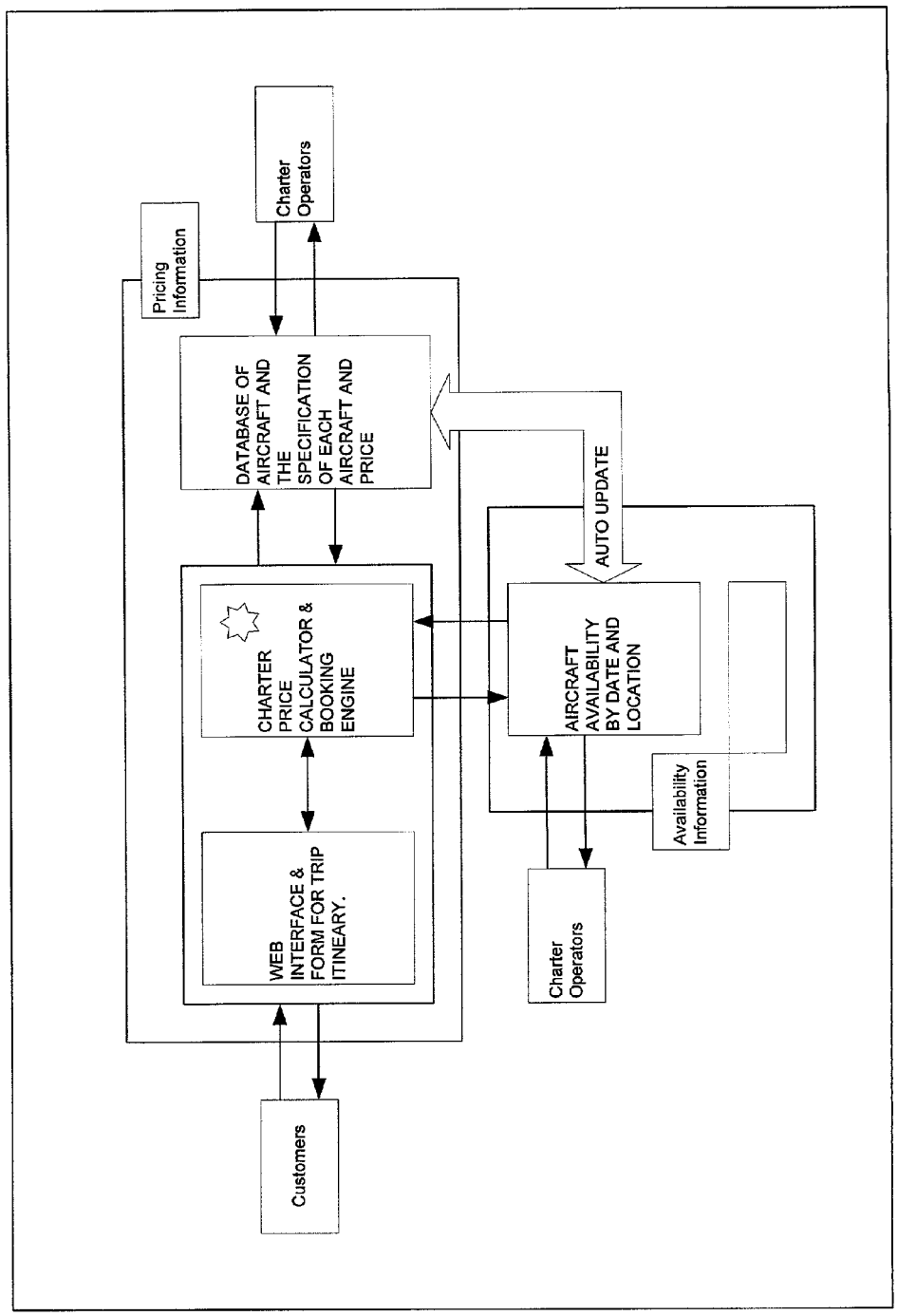
FIG. 1 is a block diagram representation of a preferred embodiment of the present invention.
Figure 2:
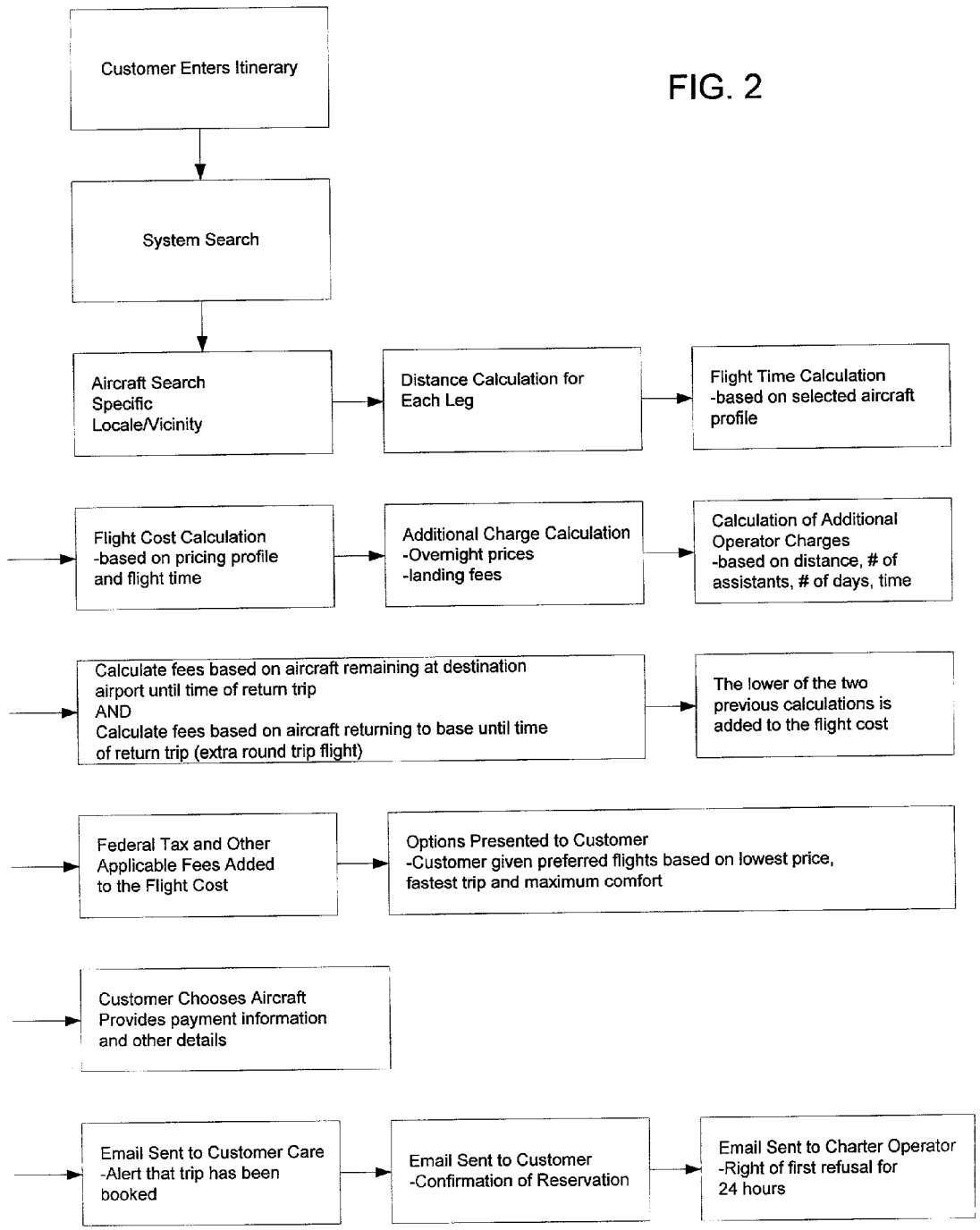
FIG. 2 is a block diagram representation of the cost calculation used in the preferred embodiment of the present invention illustrated in FIG. 1.

FIG. 1 shows an overview of the method and system of the present invention for pricing and reserving charter aircraft services. A user desiring to price and/or reserve a charter aircraft is prompted to input itinerary information such as a designated departure location and a designated destination location. In a preferred embodiment, the designated departure location can either be an airport, a city or a region. Likewise, the designated destination location can also either be an airport, a city or a region. The designated departure location and the designated destination location need not be of the same type. For example, the designated departure location may be an airport, while the designated destination location may be a city.

In another preferred embodiment, the user is provided with a means for ascertaining the name and location of airports.

As part of the itinerary information, the user may also be prompted to supply additional information such as absolute or preferred departure dates, absolute or preferred departure times, absolute or preferred arrival dates, absolute or preferred arrival times and the number of passengers to be accommodated. In another preferred embodiment of the present invention, the user is provided with access to a calendar feature enabling the user to conveniently select departure and/or destination dates.

As part of the itinerary information, the user may also designate multiple departure locations and/or multiple destination locations if their flight plans are flexible. For example, the user may designate two departure airports and three destination airports.

As part of the itinerary information, the user may also designate the desire for a round trip between the designated departure location and the designated destination location. Likewise, the user may also designate multiple flight legs if the user desires aircraft charter service to two or more destination locations. For example, the user may wish to travel from city A to city B and then from city B to city C before returning back to city A, or the user may wish to travel from city A to city B and then from city B to city C where the aircraft charter will terminate.

In a preferred embodiment of the present invention, the system receives the user's itinerary information. The itinerary information is preferably inputted by the user through a global communications network such as the World Wide Web or a local area network.

In a preferred embodiment of the present invention, the system then accesses a charter aircraft information database containing information about a plurality of charter aircraft and the itinerary information is compared with this information to identify suitable charter aircraft. The aircraft information database preferably includes such information as status, flight characteristics, present location, known future locations, occupancy capacity and operational costs for each of the charter aircraft. The status of each charter aircraft can be either positive if the charter aircraft is available or negative if the charter aircraft is unavailable for such reasons as maintenance. The flight characteristics of each charter aircraft include decent rates, ascent rates, cruising speeds and cruising altitudes. The operating costs of each charter aircraft includes daytime flight costs and nighttime flight costs.

In a preferred embodiment of the present invention, the system enables charter aircraft operators to update the charter aircraft information database. The charter aircraft operators will preferably update such information as the status, flight characteristics, present location and operational costs of each of the charter aircraft they operate.

In another preferred embodiment of the present invention, the system also accesses an airport information database containing information about a plurality of airports and the itinerary information is compared with the information in both databases to identify suitable charter aircraft. A Jeppesson airport database containing airport specific information such as longitudinal and latitudinal coordinates, elevation and runway restrictions can serve as the airport information database.

In a preferred embodiment of the present invention, suitable charter aircraft are identified by taking into account several factors such as by determining (1) whether a given charter aircraft is compatible with the airport(s) within a prescribed radius of the user's departure location(s); (2) whether that charter aircraft is compatible with the airport(s) within a prescribed radius of the user's destination location(s); (3) whether that charter aircraft has a positive status; (4) whether that charter aircraft has appropriate flight characteristics for the desired flight(s); and (5) whether that charter aircraft has a present location within a prescribed radius of the user's departure location(s) immediately prior to the departure time. In addition, suitable charter aircraft can be identified by determining whether the charter aircraft also has sufficient seating capacity to accommodate the identified number of passengers.

In a preferred embodiment of the present invention, a charter price is determined for at least one of the identified suitable charter aircraft by calculating a total charter price for each of the identified suitable charter aircraft. The total charter price for a given charter aircraft is calculated based on the cost of operating that specific charter aircraft and a calculated flight factor for flying that charter aircraft from the user's departure location(s) to the user's destination location(s). The system preferably obtains a cost of operating each charter aircraft from the charter aircraft information database and calculates the flight factor based on the user's itinerary information and the airport information database. For a given charter aircraft, the flight factor is calculated based either on an approximate flight time between the user's departure location(s) and the user's destination location(s) or an approximate flight distance between the user's departure location(s) and the user's destination location(s). Preferably, the user's departure location(s) is narrowed to a specific airport(s) and the flight factor is more or less accurately calculated based on the detailed information contained in the airport information database for the specific airport(s). Finally, grid winds between the user's departure location(s) and the user's destination location(s) are also preferably taken into account when calculating the flight factor.

As previously discussed, charter aircraft may be identified as suitable even if they are not located at the user's designated departure location(s). Therefore, when calculating the total charter price, the system also preferably take into account a repositioning cost for those suitable charter aircraft that must be repositioned. Preferably, the repositioning cost is calculated based on the cost of operating that charter aircraft and a calculated repositioning factor for flying that charter aircraft from the pre-charter location of that charter aircraft to the user's departure location(s). The repositioning factor is calculated in the same manner as the flight factor. Naturally, the repositioning cost will vary depending upon the specific airport that the charter aircraft is repositioned to. Several airports will typically be considered in determining the total charter price.

Frequently, and for a variety of reasons, charter aircraft cannot remain at the user's designated destination location(s) and must be relocated either back to the user's designated departure location or to another location. Therefore, when calculating the total charter price, the system also preferably takes into account a relocation cost for those suitable charter aircraft that must be relocated. Preferably, the relocation cost is calculated based on the cost of operating that charter aircraft and a calculated relocation factor for flying that charter aircraft from the user's departure location(s) and at least one post-charter location. The relocation factor is calculated in the same manner as the flight factor and the repositioning factor. Naturally, the relocation cost will vary depending upon the specific airport that the charter aircraft is relocated to after the charter has been completed. Several airports will typically be considered in determining the total charter price.

As previously discussed, the system of the present invention preferably permits the user to designate round trip travel and multiple flight legs. Thus, the user can designate a first leg having a first departure location and a first destination location and a second leg having a second departure location and a second destination location. Naturally, the user can be permitted to simply specify the charter will be round trip, in which case, the first destination location will be the same as the second departure location and the second destination location will be the same as the first departure location.

When the user either designates round trip travel or inputs multiple flight legs, a total flight cost is calculated by adding the flight costs for each leg of travel. Thus, for a round trip charter, the total flight cost will consist of an outbound flight cost and an inbound flight cost. Alternatively, the total flight cost for each identified suitable charter aircraft can be calculated based on the operating cost of a given charter aircraft and the total flight factor. The total flight factor is calculated based on an approximate round-trip flight time or flight distance for flying between the user's departure location(s) and the user's destination location(s) and, as with a flight factor, grid winds between the user's departure location and user's destination location are preferably taken into account. For a multiple leg charter, the total cost will consist of a first flight cost, a second flight cost and so on such that the number of flight costs equal the number of flight legs.

In addition, calculating the total charter cost preferably takes into account an outbound repositioning cost and an inbound repositioning cost. The outbound repositioning cost accounts for the possible necessity of repositioning a charter aircraft to the user's departure location(s), and the inbound repositioning cost accounts for the possible necessity of repositioning a charter aircraft from the user's second destination location to at least one post-charter location.

As can be readily appreciated, for a round trip or multiple leg charter, the total charter price may be calculated based on different charter aircraft being used to accommodate each leg of the charter flight. Thus, calculating the total charter cost preferably takes into account an outbound relocation cost and an inbound relocation cost. The outbound relocation cost accounts for the possible necessity of relocating the suitable charter aircraft from the user's first destination location to at least one intermediate location. The inbound relocation cost accounts for the possible necessity relocating the suitable charter aircraft to the user's second departure location.

In addition, calculating the total charter cost preferably takes into account a layover cost for keeping each of the suitable charter aircraft at the user's at least one destination location until the second leg occurs.

In the preferred embodiment of the present invention, the total charter price also takes into account additional charges such as taxes, over-night stays and landing fees and extra operator costs which are based on distance, duration and number of assistants.

In another preferred embodiment of the present invention, the user is permitted to specify a charter price in addition to itinerary information. The system then conducts a reverse auction. When a charter price is specified, the specified charter price is compared with the total charter price(s) calculated for each of the identified suitable charter aircraft. If at least one total charter price is equal to or less than the specified charter price, the system will automatically reserve on of the identified suitable charter aircraft. Preferably, the suitable charter aircraft with the lowest total charter price is reserved.

In another preferred embodiment of the present invention, the system identifies and prices charter travel departing and arriving at alternative airports to those designated by the user. This feature can either be done automatically or at the request of the user. Preferably, the system identifies potential departure airports located within a prescribed radius of the user's designated departure airports and identifies potential destination airports located within a prescribed radius of the user's designated destination airport(s). Fifty (50) miles is a typical default for establishing the prescribed radius. Using these alternative airports as departure locations and destination locations, the system calculates a lowest charter price for accommodating the user and transmits the results along with accompanying charter aircraft and airport information.

In another preferred embodiment of the present invention, the system receives a posting from a charter aircraft operator specifying a departure location, a destination location, an occupancy limit, a starting price and an auction end time for at least one space on a charter aircraft. The posting is then transmitted to the user using a computer. The system then receives bids including an initial charter price bid that is equal to or greater than the starting price until the auction end time. After the initial charter price bid has been received and before the auction end time, the system will only process higher charter price bids. Next, at the auction end time, the system determines the highest received bid from the initial charter price bid and the higher charter price bid(s) and reserves space on the designated charter aircraft.

After the total charter prices have been calculated, the charter prices are transmitted, using a computer, to the user. In the preferred embodiment, the charter prices are accompanied by corresponding charter aircraft information. In addition, if more than one charter aircraft is identified as suitable, the charter prices are preferably first sorted based on one of several factors before being transmitted to the user. The suitable charter aircraft may be sorted by categories such as "lowest price," "fastest trip" or "maximum comfort" in order to facilitate the user's selection. The categories may either be designated by the system or selected by the user. Preferably, the system transmits a charter price and accompanying aircraft information for at least one charter aircraft in each category.

In a preferred embodiment of the present invention, the system enables the user to request a reservation from the list of transmitted charter prices. When the user makes a request, the system automatically notifies and confirms the reservation, preferably by electronic means. Preferably, after the user makes a request, an email is sent to the reservation system maintainer alerting the reservation system maintainer that a reservation has been requested by a user. Typically, such an email will be directed to the customer service/customer care division of the reservation system maintainer. An email is also sent to the user confirming the reservation request. Typically, such an email would also include terms and conditions of the transaction. This email or a subsequent email would also include a manifest or confirmation form that the user must complete to finalize the reservation process. If the information were not already known, the confirmation form would preferably include space for the user to provide payment information. Finally, an email is also sent to the charter operator responsible for the selected charter aircraft. Customarily, this email mentions the reservation system maintainer's right of first refusal on that aircraft for a designated period of time and that during this designated period of time, the reservation system maintainer will confirm or cancel the reservation.

In a preferred embodiment of the present invention, the system will also reconfirm the reservation of the user selected charter aircraft, preferably by electronic means.

Many improvements, modifications and additions will be apparent to one skilled in the art without departing from the spirit and scope of the present invention as described herein and defined in the following claims.

What is claimed is:

1. A method for pricing and reserving charter aircraft services, comprising:

maintaining a charter aircraft information database that includes status, flight characteristics, present location, operational costs, and information about occupancy capacity for each of a plurality of charter aircraft;

receiving, using a computer, itinerary information from a user including at least one departure location, at least one destination location, at least one departure date, and a total number of passengers;

accessing the charter aircraft information database containing information about the plurality of charter aircraft;

accessing an airport information database, wherein the airport information database contains airport specific information such as longitudinal and latitudinal coordinates, elevation and runway restrictions for each airport;

identifying suitable charter aircraft by;
(1) comparing the itinerary information with the charter aircraft information,
(2) determining which of the charter aircraft are compatible with airports within a prescribed radius of the user's at least one departure location,
(3) determining which of the charter aircraft are compatible with airports within a prescribed radius of the user's at least one destination location,
(4) comparing the itinerary information with the charter aircraft information by
　(a) determining the status of each charter aircraft, wherein the status of each charter aircraft is either a positive status or a negative status,
　(b) determining whether each charter aircraft has appropriate flight characteristics, and
　(c) determining whether each charter aircraft has a present location within the prescribed radius of the user's designated at least one departure location, and
(5) eliminating charter aircraft with insufficient seating capacity;

determining a charter price for at least one of the identified suitable charter aircraft by;
(1) obtaining a cost of operating each of the suitable charter aircraft from the charter aircraft information database,
(2) calculating a flight factor for flying each of the suitable charter aircraft from the user's at least one departure location to the user's at least one destination location, wherein the flight factor is at least one of an approximate flight time between the user's at least one departure location and the user's at least one destination location and an approximate flight distance between the user's at least one departure location and the user's at least one destination location, (3) calculating a total charter price based on the operating cost and the calculated flight factor for each of the suitable charter aircraft;

transmitting, using a computer, the charter price accompanied by corresponding charter aircraft information for at least one of the identified suitable charter aircraft for which a charter price has been determined; and reserving the suitable charter aircraft in response to input from the user.

2. The method of claim 1, further comprising at least one of enabling charter aircraft operators to update the charter aircraft information database and enabling charter aircraft operators to update the status, flight characteristics, present location and operational costs of a charter aircraft.

3. The method of claim 1, further comprising receiving a request for a lowest charter price from the user.

4. The method of claim 1, wherein calculating the flight factor further comprises taking into account grid winds between te user's at least one departure location and the user's at least one destination location.

5. The method of claim 1, wherein determining a charter price for each of the suitable charter aircraft further comprises:

calculating a repositioning factor for repositioning the suitable charter aircraft from a pre-charter location to the user's at least one departure location; and calculating the total charter price also based on the calculated repositioning factor, wherein the repositioning factor is at least one of an approximate flight time between a pre-charter location and the user's at least one departure location and an approximate flight distance between a pre-charter location and the user's at least one departure location.

6. The method of claim 5, wherein calculating the repositioning factor further comprises taking into account grid winds between a pre-charter location and the user's at least one departure location.

7. The method of claim 1, wherein determining a charter price for each of the suitable charter aircraft further comprises:

calculating a relocation factor for relocating the suitable charter aircraft from the user's at least one destination location to at least one post-charter location; and calculating the total charter price also based on the calculated relocation factor, wherein the relocation factor is at least one of an approximate flight time between the user's at least one destination location and at least post-charter location and an approximate flight distance between the user's at least one destination location and at least one post-charter location.

8. The method of claim 1, wherein determining a charter price for each of the suitable charter aircraft further comprises:

calculating a repositioning factor for repositioning the suitable charter aircraft from a pre-charter location to the user's at least one departure location;

calculating a relocation factor for relocating the suitable charter aircraft from the user's at least one destination location to at least one post-charter location; and calculating the total charter price also based on the calculated repositioning factor and the calculated relocation factor, wherein the repositioning factor is at least one of (1) an approximate flight time between a pre-charter location and the user's at least one departure location and the relocation factor is an approximate flight time between the user's at least one destination location and at least post-charter location and (2) an approximate flight distance between a pre-charter location and the user's at least one departure location and the relocation factor is an approximate flight distance between the user's at least one destination location and at least one post-charter location.

9. The method of claim 8, wherein calculating the repositioning factor further comprises taking into account grid winds between a pre-charter location and the user's at least one departure location and wherein calculating the relocation factor further comprises taking into account grid winds between the user's at least one destination location and at least one post-charter location.

10. The method of claim 1, wherein determining a charter price for each of the suitable charter aircraft further comprises:

obtaining a cost of operating each of the suitable charter aircraft from the charter aircraft information database;

calculating a first flight time from a pre-charter location to the user's at least one departure location for each of the suitable charter aircraft;

calculating a repositioning cost based on the operating cost and the calculated first flight time for repositioning each of the suitable charter aircraft to the user's at least one departure location;

calculating a second flight time from the user's at least one departure location to the user's at least one destination location for each of the suitable charter aircraft;

calculating a flight cost based on the operating cost and the calculated second flight time for flying each of the suitable charter aircraft from the user's at least one departure location to the user's at least one destination location;

calculating a third flight time from the user's at least one destination location to at least one post-charter location;

calculating a relocation cost based on the operating cost and the calculated third flight time for relocating each of the suitable charter aircraft from the user's at least one destination location to the at least one post-charter location; and calculating a total charter price based on the calculated repositioning cost, the calculated flight cost and the calculated relocation cost for each of the suitable charter aircraft.

11. The method of claim 10, wherein calculating a first flight time further comprises taking into account grid winds between the pre-charter location and the user's at least one departure location, wherein calculating a second flight time further comprises taking into account grid winds between the user's at least one departure location and the user's at least one destination location and wherein calculating a third flight time further comprises taking into account grid winds between the user's at least one destination location and the at least one post-charter location.

12. The method of claim 1, further comprising calculating additional costs and wherein calculating total charter price is also based on the calculated additional costs.

13. The method of claim 12, wherein the additional costs are calculated based on at least one of taxes, over-night stays, landing fees, and extra operator costs, which are based on one of at least distance, duration, and number of assistants.

14. The method of claim 1, wherein receiving the user's itinerary information further comprises receiving a first leg having a first departure location and a first destination location and a second leg having a second departure location and a second destination location and further comprising obtaining a cost of operating each of the suitable charter aircraft from the charter aircraft information database.

15. The method of claim 14, wherein determining a charter price for each of the suitable charter aircraft further comprises:
   calculating a total flight factor for flying the first leg and the second leg for each of the suitable charter aircraft; and
   calculating a total charter price based on the operating cost and the calculated total flight factor for each of the suitable charter aircraft, wherein the total flight factor is at least one of an approximate round-trip flight time for flying between the user's at least one departure location and user's at least one destination location and an approximate round-trip flight distance between the user's at least one departure location and user's at least one destination location.

16. The method of claim 15, wherein calculating a total flight factor further comprises taking into account grid winds between the user's at least one departure location and usets at least one destination location.

17. The method of claim 14, wherein receiving itinerary information from a user further comprises receiving a round-trip designation and further comprising obtaining a cost of operating each of the suitable charter aircraft from the charter aircraft information database.

18. The method of claim 14, wherein determining a charter price for each of the suitable charter aircraft further comprises:
   calculating an outbound flight factor for each of the suitable charter aircraft for flying the first leg;
   calculating an outbound flight cost based on the operating cost and the calculated outbound flight factor for each of the suitable charter aircraft;
   calculating an inbound flight factor for each of the suitable charter aircraft for flying the second leg;
   calculating an inbound flight cost based on the operating cost and the calculated inbound flight factor for each of the suitable charter aircraft; and
   calculating a total charter price based on the calculated outbound flight cost and the inbound flight cost far each of the suitable charter aircraft.

19. The method of claims 18, wherein determining a charter price for each of the suitable charter aircraft further comprises:
   calculating an outbound repositioning factor for repositioning the suitable charter aircraft from a pre-charter location to the user's first departure location; and
   calculating an outbound repositioning cost based on the operating cost and the calculated repositioning factor, wherein the total charter price is also based on the calculated outbound repositioning cost.

20. The method of claim 19, wherein determining a charter price for each of the suitable charter aircraft further comprises:
   calculating an inbound repositioning factor for repositioning the suitable charter aircraft from the user's second destination location to at least one post-charter location;
   calculating an inbound repositioning cost based on the operating cost and the calculated repositioning factor; and
   calculating the total charter price also based on the calculated inbound repositioning cost.

21. The method of claini 20, wherein determining a charter price for each of the suitable charter aircraft further comprises:
   calculating an outbound relocation factor for relocating the suitable charter aircraft from the user's first destination location to at least one intermediate location;
   calculating an outbound relocation cost based on the operating cost and the outbound relocation factor for each of the suitable charter aircraft; and
   calculating the total charter price also based on the calculated outbound relocation cost.

22. The method of claim 21, wherein determining a charter price for each of the suitable charter aircraft further comprises:
   calculating an inbound relocation factor for relocating the suitable charter aircraft to the user's second departure location;
   calculating an inbound relocation cost based on the operating cost and the inbound relocation factor for each of the suitable charter aircraft; and
   calculating the total charter price also based on the calculated inbound relocation cost.

23. The method of claim 22, wherein determining a charter price for each of the suitable charter aircraft further comprises:
   calculating a layover cost for keeping each of the suitable charter aircraft at the user's at least one destination location until the second leg occurs; and
   calculating the total charter price also based on the calculated layover cost.

24. The method of claim 14, further comprising
   receiving a specified charter price from the user;
   comparing the user specified charter price with the total charter price for each of the identificd suitable charter aircraft; and
   reserving one of the identified suitable charter aircraft having a total charter price equal to or lower than the user specified charter price.

25. The method of claim 1, further comprising
   receiving a specified charter price from a user;
   comparing the user specified charter price with the charter price for each of the identified suitable charter aircraft; and
   reserving one of the identified suitable charter aircraft having a charter price equal to or lower than the user specified charter price.

26. The method of claim 1, wherein reserving the user selected charter aircraft further comprises at least one of receiving a manifest from the user, receiving payment information, notifying the owner of the selected charter aircraft, sending a reservation confirmation to the user and to the owner of the selected charter aircraft, and reconfirming the reservation of the user selected charter aircraft.

27. The method of claim 1, wherein determining a charter price for each of the suitable charter aircraft further comprises:
   identifying at least one potential departure airport located within a prescribed radius of the user's designated at least one departure location;
   identifying at least one potential destination airport located within a prescribed radius of the user's designated at least one destination location;
   calculating a lowest charter price for flying from the at least one potential departure airport to the at least one potential destination for each of the suitable charter aircraft; and transmitting, using a computer, the lowest charter price to the user accompanied by corresponding charter aircraft information for at least one of the identified suitable charter aircraft.

28. The method of claim 27, further comprising accessing an airport information database, wherein identifying at least one potential departure airport further comprises searching the airport information database for airports that are located within a prescribed radius of the user's designated departure location and that are capable of accommodating the charter aircraft and wherein identifying at least one potential destination airport further cornpnses searching the airport information database for airports that are located within a prescribed radius of the user's designated destination location and that are capable of accommodating the charter aircraft.

29. The method of claim 28, wherein the airport information database is a Jeppesen airport database containing airport specific information such as longitudinal and latitudinal coordinates, elevation and runway restrictions for each airport.

30. The method of claim 29, wherein the prescribed radius is fifty (50) miles.

31. The method of claim 1, wherein transmitting the charter prices accompanied by corresponding charter aircraft information further comprises sorting the charter prices by lowest charter price and transmitting at least one of the sorted charter prices accompanied by corresponding charter aircraft information.

32. The method of claim 1, wherein transmitting the charter prices accompanied by corresponding charter aircraft information further comprises sorting the charter prices by fastest trip and transmitting at least one of the sorted charter prices accompanied by corresponding charter aircraft information.

33. The method of claim 1, wherein transmitting the charter prices accompanied by corresponding charter aircraft information further comprises sorting the charter prices by comfort and transmitting at least one of the sorted charter prices accompanied by corresponding charter aircraft information.

34. The method of claim 1, wherein transmitting the charter prices accompanied by corresponding charter aircraft information further comprises:
sorting the charter prices by lowest price, fastest trip and comfort;
transmitting at least one of the charter prices accompanied by corresponding charter aircraft information having the highest ranking for lowest price;
transmitting at least one of the sorted charter prices accompanied by corresponding charter aircraft information having the highest ranking for fastest trip; and
transmitting at least one of the sorted charter prices accompanied by corresponding charter aircraft information having the highest ranking for comfort.

35. The method of claim 1, wherein the database of charter aircraft information is a computerized database accessible via global computer networks.

36. The method of claim 1, wherein the database of charter aircraft information is a computerized database accessible via local area networks.

37. The method of claim 36, wherein the itinerary information is inputted by the user through a global communications network.

38. The method of claim 37, wherein the itinerary information is inputted by the user through the World Wide Web.

39. The method of claim 1, further comprising providing the user with access to a calendar feature enabling the user to conveniently select a departure date.

40. The method of claim 1, further comprising receiving a user selection of at least one charter aircraft from a transmitted list of at least one charter aircraft.

41. The method of claim 40, wherein reserving the user selected charter aircraft further comprises at least one of receiving a manifest from the user, receiving payment for reserving the user selected charter aircraft, notifying the charter aircraft operator of the selected charter aircraft, sending a reservation confirmation to the user and to the charter aircraft operator of the selected charter aircraft, and reconfirming the reservation of the user selected charter aircraft.

42. A system for pricing and reserving charter aircraft, comprising:
a data storage system;
at least one charter aircraft information database containing information about a plurality of charter aircraft stored on the data storage system, wherein the charter aircraft information database includes status, flight characteristics, present location, operational costs, and information about occupancy capacity for each of the plurality of charter aircraft;
means for receiving itinerary information from a user including at least one departure location, at least one destination location, at least one departure date, and a total number of passengers;
means for accessing the at least one charter aircraft information database;
means for accessing an airport information database, wherein the airport information database contains airport specific information such as longitudinal and latitudinal coordinates, elevation and runway restrictions for each airport;
means for identifying suitable charter aircraft by:
(1) comparing the itinerary information with the charter aircraft information,
(2) determining which of the charter aircraft are compatible with airports within a prescribed radius of the user's at least one departure location,
(3) determining which of the charter aircraft are compatible with airports within a prescribed radius of the user's at least one destination location,
(4) comparing the itinerary information with the charter aircraft information by
(a) determining the status of each charter aircraft, wherein the status of each charter aircraft is either a positive status or a negative status,
(b) determining whether each charter aircraft has appropriate flight characteristics, and
(c) determining whether each charter aircraft has a present location within the prescribed radius of the user's designated at least one departure location, and
(5) eliminating charter aircraft witt insufficient seating capacity;
means for determining a charter price for at least one of the identified suitable charter aircraft by:
(1) obtaining a cost of operating each of the suitable charter aircraft from the charter aircraft information database,
(2) calculating a flight factor for flying each of the suitable charter aircraft from the user's at least one departure location to the user's at least one destination location, wherein the flight factor is at least one of an approximate flight time between the user's at least one departure location and the user's at least one destination location and an approximate flight distance between the user's at least one departure location and the user's at least one destination location,
(3) calculating a total charter price based on the operating cost and the calculated flight factor for each of the suitable charter aircraft;

means for transmitting the charter price accompanied by corresponding charter aircraft information for at least one of the identified suitable charter aircraft for which a charter price has been determined; and means for reserving the suitable charter aircraft in response to input from the user.

43. The system of claim 42, wherein the airport information database is a standard Jeppesen airport database.

44. The system of claim 42, wherein the means for receiving itinerary information from the user is through a global computer network.

45. The system of claim 42, further comprising means for receiving selection of at least one charter aircraft from a transmitted list of at least one charter aircraft from the user.

46. The system of claim 42, further comprising means for sending, receiving and processing a manifest from the user.

47. The system of claim 42, further comprising means for notifying the charter aircraft operator of the user's reservation of the selected charter aircraft.

48. The system of claim 47, further comprising means for sending a reservation confirmation to the user and to the charter aircraft operator of the selected charter aircraft.

49. The system af claim 48, further comprising means for reconfirming the reservation of the user selected charter aircraft.

50. The system of claim 49, further comprising:

means for identifying alternative airports based on proximity to the user's designated departure location and the user's designated destination location;

means for calculating a lowest charter price based on the alternative airports for at least one of the identified suitable charter aircraft; and means for transmitting the lowest charter price accompanied by corresponding charter aircraft information and corresponding alternative airport information for at least one of the identified suitable charter aircraft for which a charter price has been determined.

51. The system of claim 42, further comprising means for conducting a real-time auction.

52. The system of claim 42, further comprising means for conducting a reverse auction.

* * * * *